United States Patent

Simon

[15] 3,653,254
[45] Apr. 4, 1972

[54] LEAK-TESTING INTERNAL SEALS IN PIPE JOINTS

[72] Inventor: Theodore A. Simon, Calgary, Alberta, Canada

[73] Assignee: Shell Oil Company, New York, N.Y.

[22] Filed: Oct. 16, 1970

[21] Appl. No.: 81,304

[52] U.S. Cl. .................................................. 73/46, 73/151
[51] Int. Cl. ................................................................. G01m 3/08
[58] Field of Search ................... 73/46, 37, 40, 151; 138/90; 285/96

[56] References Cited

UNITED STATES PATENTS 2,663,183  12/1953  Huhn .......................................... 73/46
2,695,632  11/1954  Brock ...................................... 73/46 X
3,371,521  3/1968  Hauk ............................................ 73/46

*Primary Examiner*—Louis R. Prince
*Assistant Examiner*—William A. Henry, II
*Attorney*—Harold L. Denkler and Theodore E. Bieber

[57] ABSTRACT

The leak-testing of thread-connected, multiple-seal pipe joints is improved by connecting them to a limited extent that engages at least one internal seal without engaging the outermost seal, increasing the external fluid pressure to an amount significantly greater than the internal pressure, and detecting any resultant inflow of fluid.

4 Claims, 2 Drawing Figures

LEAK-TESTING INTERNAL SEALS IN PIPE JOINTS

BACKGROUND OF THE INVENTION

The invention relates to leak-testing the joints in pipe strings, such as tubing or casing strings of the types used in the highest pressured wells, plants, refineries, etc. Such pipe joints are generally thread-connected, multiple-sealing joints, having at least one internal and one external set of sealing shoulders. The pipe joints commonly used in high pressure wells are typified by the Hydril "CS" and "PH" tubing joints and high pressure casing joints.

In previously developed leak testing processes, such pipe joints are tested by connecting them substantially completely and applying an external or internal pressurization that is at least substantially equal to the full-rated pressure resistance of the joint. As indicated in U.S. Pat. No. 3,371,521, improved equipment and techniques are now available for applying such leak testing pressures externally at the site of a use location such as a well, plant, refinery, or the like, in which a pipe string is being installed.

SUMMARY OF THE INVENTION

An internal seal in a thread-connected, multiple-seal pipe joint is leak-tested by connecting the joint to a limited extent at which at least one internal seal is engaged without engaging the external seal, increasing the external fluid pressure to a value significantly greater than the internal pressure, and detecting any resultant inflow of fluid.

In a preferred embodiment, both the thread-connecting torque and the test fluid pressurization are relatively small fractions of the amounts corresponding to the complete thread connection and full pressure resistance rating. The use of such reduced torque and pressures, in the above manner, provides a testing of the internal seal that is actually more severe than a conventional type of internal testing that uses the full connecting torque and the maximum fluid pressurization. The present process, of externally pressurizing the fluid around a pipe joint connected to an extent that engages only an internal seal, applies the fluid pressure so that it tends to disengage the internal seal and to cause leakage at rates that increase with increases in the test pressure. In contrast, a test using internal fluid pressurization tends to apply the fluid pressure so that it may either seal or disengage the internal seal depending upon connection configuration and may allow no leakage in response to increasing pressurization (until the joint walls are ruptured). Because of this, the present process may be more definitive, with respect to the effectiveness of the internal seal, as well as cheaper than conventional tests. The conventional tests use more extensive torquing and pressurization and thus require greater operating time and expense.

The present internal seal testing with external test pressure at low torque is possible because of the relationship between make-up torque and external leak pressure in multiple seal connections. In a torque range such that only the internal seal is engaged (for example, up to one-third full recommended torque with respect to the Hydril CS and PH joints), the external leak pressure is proportional to torque. At high torque this relationship changes and is no longer representative of internal seal effectiveness. Since there is a design leak pressure (i.e., a pressure that induces leakage when the sealing surfaces are undamaged) for a specific connection at a specific low torque, a leak observed at a lower pressure indicates internal seal malfunction. Such defects as out-of-round pipe, internal lip or seal damage, foreign matter in threads causing premature torque levels, external seal damage causing premature shouldering, and improper machining tolerances, or the like, can result in a recognizable seal malfunction.

DESCRIPTION OF THE INVENTION

Figure 1:
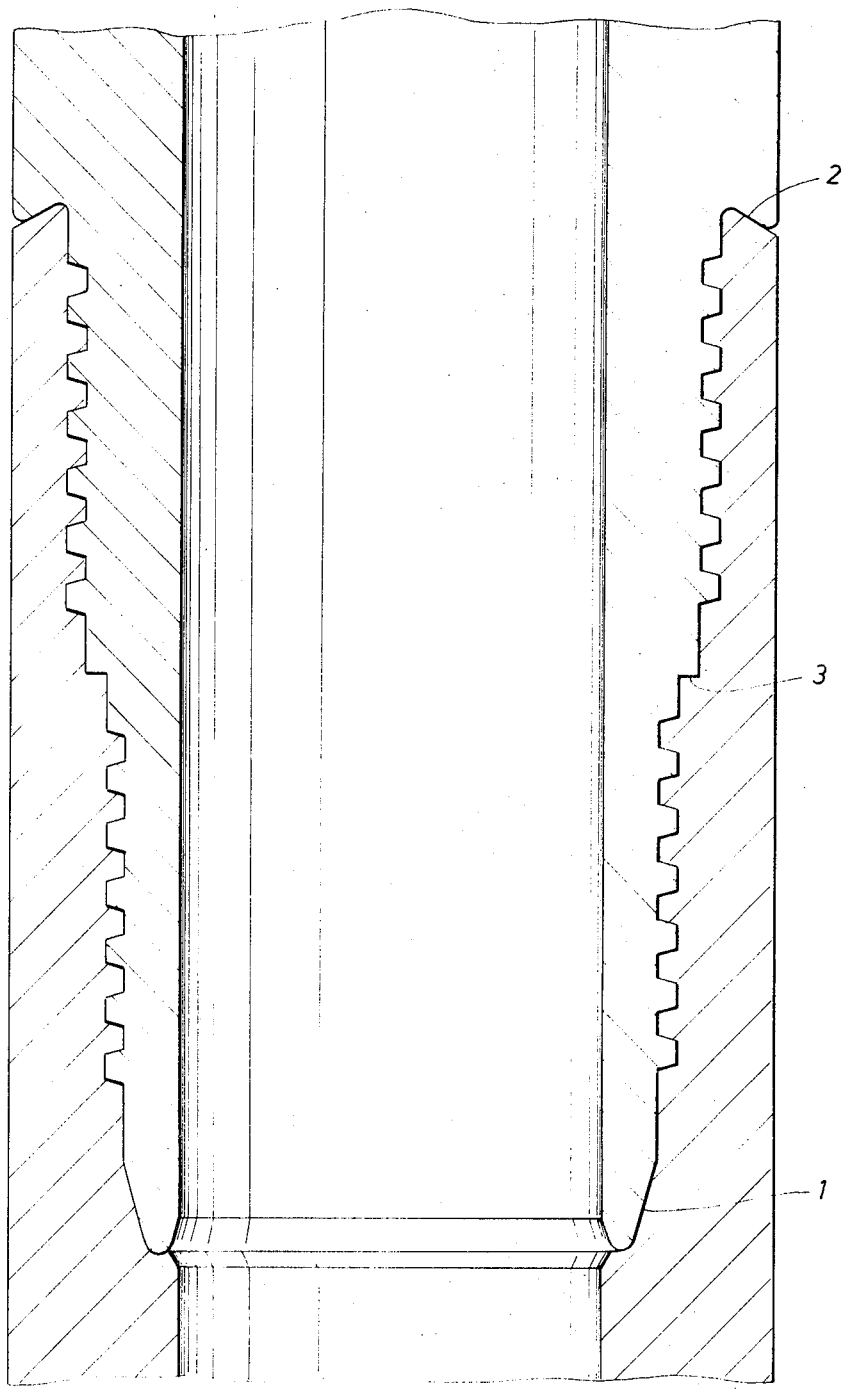
FIG. 1 is a cross sectional view of the threads and sealing elements of a Hydril "CS" pipe joint.

In making up a thread-connected, multiple-seal pipe joint, such as the Hydril "CS" joint of the type shown in FIG. 1, the first sealing occurs at the internal (14°) seal 1. As the thread-connecting torque is increased, the external (60°) seal 2 and the intermediate shoulder seal 3 are subsequently engaged.

Figure 2:
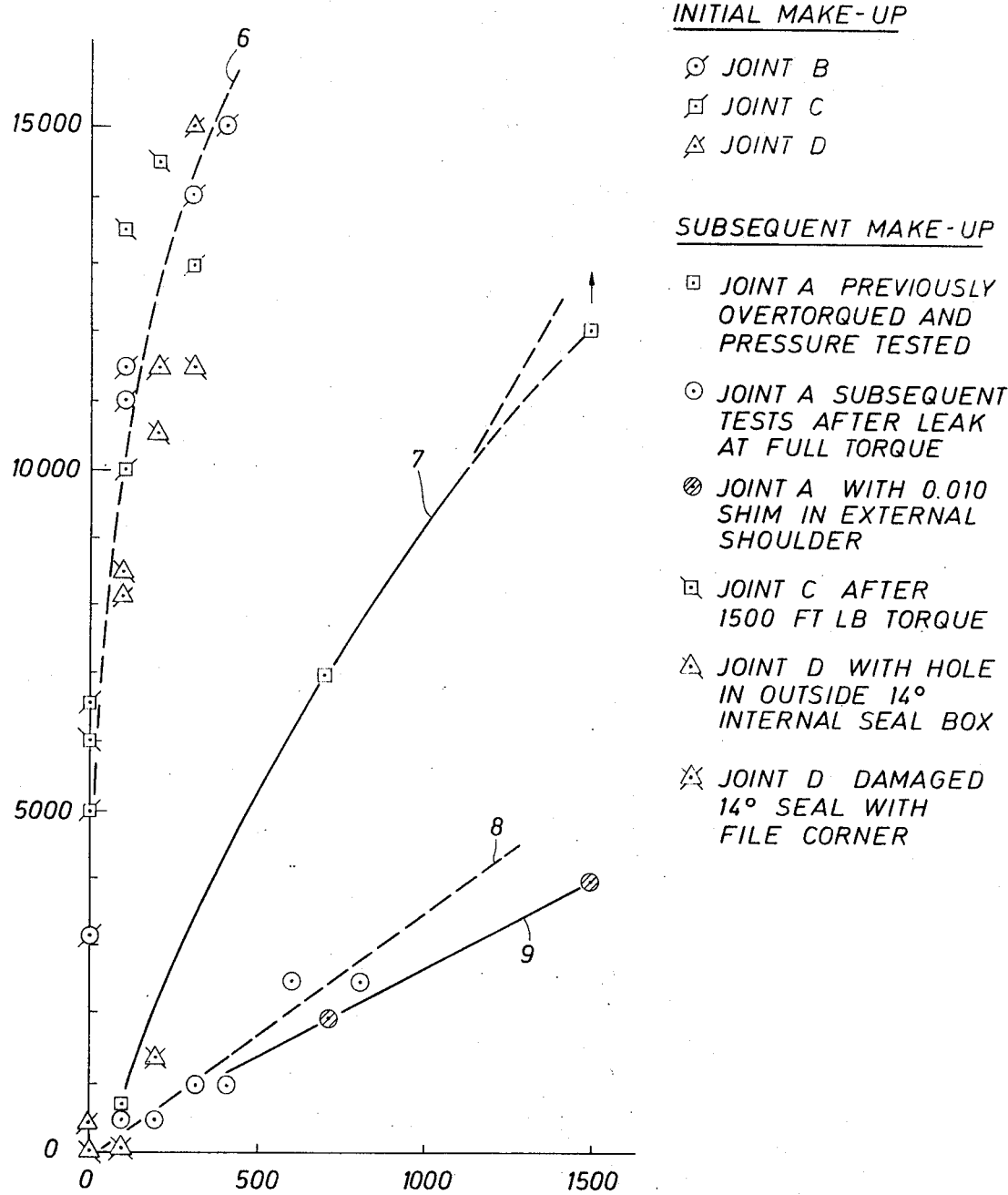
FIG. 2 is a plot of amounts of external fluid pressurization sufficient to cause leakage versus the torque applied in connecting the threads of a tool joint.

FIG. 2 is a plot of the results of a series of tests on Hydril "CS" tubing string joints (A, B, C and D) for 2 ⅜ inch tubing. The data points for the individual tests (described on the figure) are distinguished by squares, circles, etc. In the plot, the ordinate is the external fluid pressure, in pounds per square inch, which was required to cause leakage into the tool joint interior (at substantially atmospheric pressure) and the abscissa is the amount of thread-connecting torque, in foot pounds, which was applied in connecting the joints. The zero point on the abscissa represents a hand tight make-up torque that allowed the external shoulder, at external seal 3 to remain off its seal by 0.011 inch. Curve 6 shows the pressures required to cause leakage through new and undamaged pipe joints. Curve 7 shows the results with previously used, but undamaged, joints and curves 8 and 9 show the relatively low pressures which are required to cause leakage through joints that were subjected to the indicated types of actual or synthesized type of damage.

It will be apparent to those skilled in the art that where the internal seal is sound, the joint is likely to be sound. The tests of the present type can advantageously be conducted by applying only a fraction (for example, 10 percent) of the full make-up torque and applying only a fraction (for example, 30 percent) of the rated external pressure. If no leakage results, the internal seal can be assumed to be sound, and the pipe joint can be made up and used without further testing.

Ninety-one joints of 2 ⅞ inch, 7.9 lb/ft, N-80 Hydril PH6–CB tubing were field tested with the Gator Hawk external hydrostatic tester (substantially as described in U.S. Pat. No. 3,371,521) using relatively low make-up torques and reduced pressures. The connections were tested with a 0.002 inch gap (determined by feeler gauge) in the 60° external seal to assure that the internal 14° primary seal was being tested. Make-up torque required to achieve this gap was 200 to 300 ft. lb., while required make-up torque for this type of tubing is 3,000 ft. lb.

A two-step procedure was used for the tests. Eighty-two of the joints were tested first to 5,500 p.s.i. at 200 to 300 ft. lb. torque with 0.002 inch gap in the external 30° seal. If there was no leak, the joints were then made up to full torque, 3,000 ft. lb., and tested to full test pressure, 9,000 p.s.i. One bad joint, caused by a mashed-in shoulder on the 30° external seal on the pin, was detected in this group at 5,500 p.s.i. The defect would not let the 14° internal seal preload enough to hold pressure. The last nine joints were tested first to 9,000 p.s.i. at 200 to 300 ft. lb. torque with 0.002 inch gap in the external 30° seal. The joints were then made up to full torque, 3,000 ft. lb., and again tested to 9,000 p.s.i. No leaks were detected in this last group.

The present testing process can be applied to substantially any thread-connected, multiple-seal pipe joint. In general, the making-up of the pipe joint connecting threads and the application of the external fluid pressurization can employ substantially any techniques and equipment adapted to cause one or more of the internal seals to be engaged without engaging the external seal and applying a fluid pressure differential that is significant but is less than the collapsing pressure of the tool joint. Such tests are preferably applied at the site of a well in which an assembled pipe string is being installed.

The present invention can advantageously be used as a process for testing pipe connections at the manufacturing plant for quality control or for assembling and installing a pipe string in a well borehole, or the like. The process comprises assembling a pipe string from sections joined by thread-connected, multiple-seal pipe joints, connecting each pipe joint to a limited extent at which at least one internal seal is engaged without engaging the external seal, increasing the external fluid pressure to a selected value significantly higher than the internal pressure, detecting any resultant inflow of fluid, completing the connecting and installing of the pipe string with respect to each pipe joint through which no leakage is induced, and disconnecting and correcting or replacing each pipe joint through which leakage is induced.

What is claimed is

1. A process for leak testing a thread-connected, multiple-seal pipe joint comprising:
connecting the joint to a limited extent that engages at least one inner seal without engaging the external seal;
increasing the external fluid pressure to selected pressure significantly greater than the internal pressure; and
detecting any resultant inflow of the pressurized external fluid.

2. The process of claim 1 in which the amounts of torque, applied in connecting the threads of the pipe joint, and external fluid pressurization are significantly less than those corresponding to full tool joint connection torque and full rated pressure resistance of the tool joint.

3. The process of claim 1 in which the pipe joint connecting and testing is conducted at a use location on pipe joints which are being quality control tested in a pipe string.

4. A process for installing a pipe string in a borehole of a well comprising:
assembling a pipe string from sections joined by thread-connected, multiple-seal pipe joints;
partially connecting at least one pipe joint to a limited extent that engages at least one inner seal without engaging the external seal;
increasing the external fluid pressure to a specific pressure significantly greater than the internal pressure within said partially connected pipe joint;
detecting any resultant inflow of said pressurized external fluid;
completing the connecting and running into the borehole of pipe joints through which no fluid inflow is induced; and
disconnecting and correcting or replacing pipe joints through which fluid inflow is induced.

* * * * *

Notice of Adverse Decision in Interference

In Interference No. 98,115 involving Patent No. 3,653,254, T. A. Simon, LEAK-TESTING INTERNAL SEALS IN PIPE JOINTS, final judgment adverse to the patentee was rendered Feb. 28, 1974, as to claims 1, 2, and 3.

[*Official Gazette May 21, 1974.*]